(12) United States Patent
Bruns

(10) Patent No.: US 12,139,959 B2
(45) Date of Patent: Nov. 12, 2024

(54) REGULATING VALVE FOR A DOOR DRIVE AND TO A DOOR DRIVE

(71) Applicant: dormakaba Deutschland GmbH, Ennepetal (DE)

(72) Inventor: Marcus Bruns, Ennepetal (DE)

(73) Assignee: dormakaba Deutschland GmbH, Ennepetal (DE)

( * ) Notice: Subject to any disclaimer, the term of this patent is extended or adjusted under 35 U.S.C. 154(b) by 439 days.

(21) Appl. No.: 17/328,192

(22) Filed: May 24, 2021

(65) Prior Publication Data

US 2021/0372185 A1 Dec. 2, 2021

(30) Foreign Application Priority Data

May 27, 2020 (EP) .................................... 20176870

(51) Int. Cl.
*E05F 15/53* (2015.01)
*E05F 3/12* (2006.01)

(52) U.S. Cl.
CPC ............... *E05F 3/12* (2013.01); *E05F 15/53* (2015.01); *E05Y 2201/458* (2013.01); *E05Y 2900/132* (2013.01)

(58) Field of Classification Search
CPC ......... E05Y 2900/132; E05Y 2201/458; E05F 15/53; E05F 3/12
See application file for complete search history.

(56) References Cited

U.S. PATENT DOCUMENTS

| 6,112,368 | A  | * | 9/2000 | Luckett | E05F 3/12 16/49 |
| 8,240,005 | B2 | * | 8/2012 | Hufen | E05F 3/12 16/49 |
| 2004/0056226 | A1 | * | 3/2004 | Assmann | F16H 61/0276 251/366 |
| 2008/0092447 | A1 | * | 4/2008 | Bienek | E05F 15/72 49/340 |
| 2008/0127562 | A1 | * | 6/2008 | Bienek | E05F 3/223 49/334 |
| 2008/0209811 | A1 | * | 9/2008 | Bienek | E05F 3/224 49/139 |
| 2008/0222957 | A1 | * | 9/2008 | Bienek | E05F 3/104 49/43 |

(Continued)

FOREIGN PATENT DOCUMENTS

CN 109630721 A 4/2019
CN 110260025 A 9/2019
(Continued)

*Primary Examiner* — Jason W San
(74) *Attorney, Agent, or Firm* — CANTOR COLBURN LLP

(57) ABSTRACT

Described and illustrated is a regulating valve for a door drive, wherein the regulating valve has an axis of rotation, wherein the regulating valve includes at least two ends and at least two sealing sections, wherein the regulating valve includes a regulating section, and the regulating section is disposed between the sealing sections. A regulating valve for a door drive, which is particularly simply manufacturable, is realized in that at least one radial thickening forms at least one of the sealing sections, wherein at least one radial tapering of the regulating valve forms the regulating section.

7 Claims, 3 Drawing Sheets

(56) References Cited

U.S. PATENT DOCUMENTS

| | | | | |
|---|---|---|---|---|
| 2010/0024303 A1* | 2/2010 | Wulbrandt | ................ | E05F 3/12 49/70 |
| 2010/0192325 A1* | 8/2010 | Hufen | ....................... | E05F 3/12 251/366 |
| 2016/0362925 A1* | 12/2016 | Hellwig | .................... | E05F 3/10 |
| 2021/0372185 A1* | 12/2021 | Bruns | ...................... | E05F 3/12 |
| 2021/0372190 A1* | 12/2021 | Hellwig | ................. | E05F 1/006 |

FOREIGN PATENT DOCUMENTS

| | | |
|---|---|---|
| DE | 1088391 B | 9/1960 |
| DE | 102010008167 A1 | 8/2011 |
| EP | 2730822 A2 | 5/2014 |
| EP | 2921625 A1 | 9/2015 |
| EP | 3263815 A1 | 1/2018 |
| EP | 3103949 B1 | 8/2018 |
| WO | 2019206510 A1 | 10/2019 |

\* cited by examiner

REGULATING VALVE FOR A DOOR DRIVE AND TO A DOOR DRIVE

CROSS-REFERENCE TO RELATED APPLICATIONS

This application claims priority to European Patent Application No. 20176870.2, filed on May 27, 2020, the contents of which are hereby incorporated by reference in their entirety.

TECHNICAL FIELD

The disclosure relates to a regulating valve for a door drive, wherein the regulating valve includes an axis of rotation, wherein the regulating valve includes at least two ends, wherein the regulating valve includes at least two sealing sections, wherein the regulating valve includes a regulating section, wherein the regulating section is disposed between the sealing sections. Furthermore, the disclosure relates to a door drive.

BACKGROUND

The EP 3 103 949 B1 discloses a door drive having a housing and at least one regulating valve for the adjustable regulation of a fluid flow within the door drive. This regulating valve is disadvantageous in that it includes many components and requires complicated processing steps during manufacturing. Hereby, it is neither inexpensive nor simply manufacturable.

SUMMARY

Therefore, the disclosure provides a regulating valve for a door drive, which is particularly simply manufacturable. Furthermore, the disclosure provides a regulating valve for a door drive, which is particularly inexpensively manufacturable. Furthermore, the disclosure provides a door drive, which is particularly simply manufacturable. Furthermore, the disclosure provides a door drive, which is particularly inexpensively manufacturable.

The above-developed and indicated advantages are achieved by providing the regulating valve for a door drive described in the introduction, in that at least one of the sealing sections is formed by at least one radial thickening, wherein the regulating section is formed by at least one radial tapering of the regulating valve. Advantageous further developments of the disclosure are indicated in the dependent claims, the description and in the Figures. Herein, radial thickening means that the diameter of the regulating valve is greater at this location than the diameter of directly neighbouring areas seen along the axis of rotation. Herein, tapering means that the diameter of the regulating valve is smaller at this location than the diameter of directly neighbouring areas seen along the axis of rotation.

Furthermore, it can be provided that the radial thickening or at least one of the radial thickenings is formed integrally with the regulating valve. Hereby, achieving that the regulating valve is simply and inexpensively manufacturable.

Furthermore, it can be provided that the tapering or at least one of the taperings includes a symmetric cross-section in the direction of the axis of rotation. Hereby, achieving that the regulating valve is simply and inexpensively manufacturable.

Furthermore, it can be provided that the regulating valve includes at least one engagement. Hereby, achieving that the regulating valve is simply operable, for example with a tool or by hand.

Furthermore, it can be provided that the one engagement or at least one of the engagements is disposed at one of the ends. Hereby achieving that the engagement is easily accessible.

Furthermore, it can be provided that each end includes at least one engagement. Hereby achieving that the regulating valve is operable from both ends.

Furthermore, it can be provided that the regulating valve is rotatable about the axis of rotation by means of the one engagement of by means of at least one of the engagements.

Furthermore, it can be provided that the regulating valve includes a thread.

Furthermore, it can be provided that the thread or the at least one of the threads is formed coaxially to the axis of rotation.

Furthermore, it can be provided that the thread or at least one of the threads is disposed at one of the ends.

Furthermore, it can be provided that at least one end includes both a thread and an engagement.

Furthermore, it can be provided that the regulating valve includes a guiding section at one of the ends.

Furthermore, it can be provided that the guiding section has a smaller diameter than another end.

Furthermore, it can be provided that the radial thickening or at least one of the radial thickenings extends rotationally symmetrically about the axis of rotation. Hereby achieving that the thickenings reliably fulfil the sealing function thereof.

Furthermore, it can be provided that the tapering or at least one of the taperings extends rotationally symmetrically about the axis of rotation. Hereby achieving that the regulating effect of the tapering is independent of a pure rotation of the regulating valve about the axis of rotation thereof.

Furthermore, it can be provided that several radial thickenings form at least one of the sealing sections, wherein the thickenings are spaced apart from each other along the axis of rotation. Hereby achieving that the thickenings particularly reliably fulfil the sealing function thereof.

Furthermore, it can be provided that the regulating valve is screwable into a door drive by means of the one thread or by means of one of the threads. Hereby achieving that the regulating valve is reliably adjustable and guidable in a door drive.

Furthermore, it can be provided that the regulating valve is made from plastic material. Hereby, achieving that the regulating valve is simply and inexpensively manufacturable.

Furthermore, it can be provided that the plastic material is polyamide. Hereby, achieving that the regulating valve is simply and inexpensively manufacturable.

Furthermore, it can be provided that the plastic material contains fibres.

Furthermore, it can be provided that the fibres include glass fibres.

Furthermore, it can be provided that the fibres amount to 5 to 50 mass percentage, preferably 20 to 40 mass percentage, particularly preferred 25 to 35 mass percentage of the plastic material.

Furthermore, it can be provided that the regulating valve includes at least one surrounding annular sealing groove.

Furthermore, it can be provided that the regulating valve includes at least one sealing ring.

Furthermore, it can be provided that the sealing ring or at least one of the sealing rings is disposed in the annular sealing groove or one of the annular sealing grooves.

Furthermore, it can be provided that the annular sealing groove or at least one of the annular sealing grooves is disposed between an end and the nearest sealing section.

Furthermore, it can be provided that the regulating valve includes at least two sealing rings, wherein at least one sealing ring has a smaller diameter that another sealing ring. Hereby achieving that, when inserting the regulating valve into the door drive, the sealing ring with the smaller diameter is protected from damages, in particular by a receiving thread of the regulating valve reception. Hereby, the diameter of a sealing ring denotes the outer diameter of said sealing ring.

Furthermore, it can be provided that the regulating valve is an injection-moulded part. Hereby, achieving that the regulating valve is simply and inexpensively manufacturable.

Furthermore, it can be provided that the regulating valve is a turned part. Hereby, achieving that the regulating valve is simply and inexpensively manufacturable.

Furthermore, the above-developed and indicated advantage is achieved based on the initially described door drive in that the door drive includes a regulating valve according to any of the aforementioned claims. Hereby, achieving that the door drive is particularly simply manufacturable.

Advantageous further developments of the disclosure are indicated in the dependent claims, the description and in the Figures.

Furthermore, it can be provided that the door drive includes at least one regulating valve reception, wherein the regulating valve or at least one of the regulating valves is accommodated in a regulating valve reception of the door drive. Hereby achieving that the regulating valve is reliably accommodated in the door drive.

Furthermore, it can be provided that at least one of the sealing sections has a larger diameter than the diameter of the associated regulating valve reception. Hereby achieving that the sealing section, respectively at least one of the sealing sections in the respective associated regulating valve reception can reliably fulfil the sealing function thereof. This is realized in that the sealing section, or at least one of the sealing sections is elastically deformed, this means reversibly. Thus, the sealing section adapts to the surface of the regulating valve reception facing the regulating valve.

Furthermore, it can be provided that the door drive has a longitudinal axis, wherein the longitudinal axis is defined by the direction of movement of a piston disposed in the door drive or a spring disposed in the door drive, wherein the regulating valve or at least one of the regulating valves is disposed vertically to the longitudinal axis. Hereby, achieving that the door drive is particularly simply manufacturable.

Furthermore, it can be provided that at least one regulating valve reception includes a guide section reception, wherein the guide section reception accommodates the guide section of the associated regulating valve. Hereby, achieving that the door drive is particularly simply manufacturable. Furthermore, hereby achieving that the associated regulating valve is reliably guided in the regulating valve reception.

Furthermore, it can be provided that a stepped bore forms the regulating valve reception, wherein the stepped bore includes at least two sections in longitudinal direction, wherein one of the sections forms the guide section reception. Hereby, achieving that the door drive is particularly simply manufacturable.

Furthermore, it can be provided that the section with the smallest diameter forms the guide section reception.

Furthermore, it can be provided that the door drive includes an output shaft, wherein the output shaft is supported in the door drive, wherein the output shaft is rotatable about an output axis, wherein the output shaft includes at least one connection, wherein the connection or at least one of the connections serves for connecting an arm assembly.

Furthermore, it can be provided that the regulating valve or at least one of the regulating valves is disposed vertically to the output axis. Hereby achieving that the regulating valve, respectively at least one of the regulating valves is easily accessible in the state mounted to the door.

Furthermore, it can be provided that the regulating valve or at least one of the regulating valves connects at least two hydraulic channels in the door drive. Hereby, achieving that the door drive is particularly simply manufacturable.

Furthermore, it can be provided that the regulating valve or at least one of the regulating valves serves for controlling the hydraulic flow between the hydraulic channels. Hereby achieving that the hydraulic flow is particularly reliably controllable.

Furthermore, it can be provided that the hydraulic channels extend vertically to the axis of rotation. Hereby, achieving that the door drive is particularly simply manufacturable.

Furthermore, it can be provided that the hydraulic channels extend coaxially. Hereby, achieving that the door drive is particularly simply manufacturable.

Furthermore, it can be provided that at least one of the sealing sections is made from a softer material than the respective associated regulating valve reception. Hereby achieving that the sealing section, respectively at least one of the sealing sections in the respective associated regulating valve reception, by elastic deformation, adapts to the inner diameter of the regulating valve reception.

Furthermore, it can be provided that the regulating valve reception or at least one of the regulating valve receptions includes at least one reception thread, wherein the reception thread or at least one of the reception threads cooperates with an associated thread of the associated regulating valve.

Hereby achieving that the regulating valve is movable along the axis of rotation thereof.

Furthermore, it can be provided that the door drive includes an arm assembly, wherein the arm assembly is connected to the output shaft of the door drive, wherein the arm assembly serves for transferring force between the door drive and a door leaf or door frame.

Furthermore, it can be provided that the arm assembly is a scissor arm assembly.

Furthermore, it can be provided that the arm assembly is a sliding rail arm assembly.

Furthermore, it can be provided that the output shaft protrudes from the door drive on two opposite sides, wherein the output shaft includes a connection on both sides. Depending on the mounting orientation of the door drive, for example, one of the two connections can be used and is accordingly connected to the arm assembly. The other connection remains unused.

BRIEF DESCRIPTION OF THE DRAWINGS

Hereinafter, the disclosure is explained in more detail based on exemplary embodiments. Technical features having the same function are identified in the Figures with identical reference numerals. It shows.

DETAILED DESCRIPTION OF THE DRAWINGS

Figure 1A:
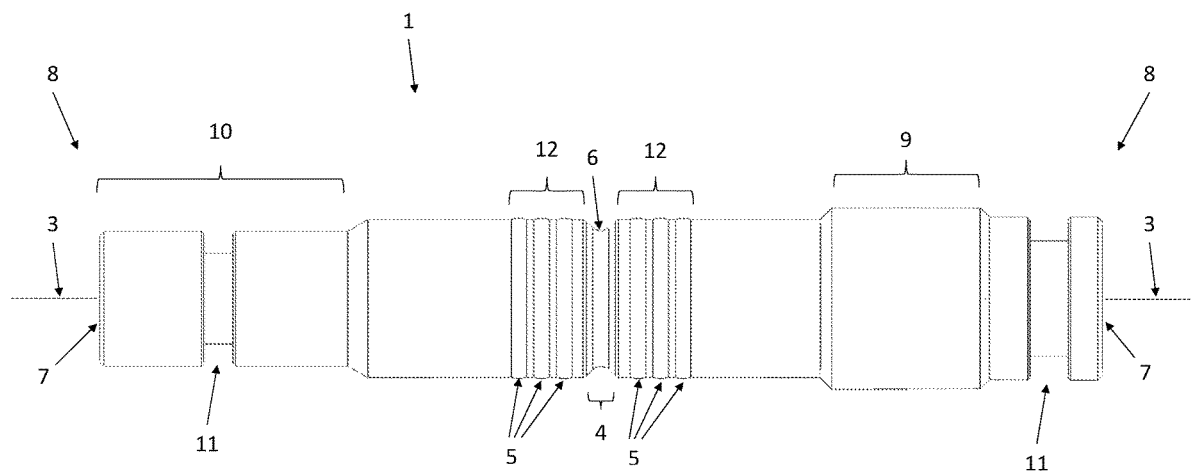
FIGS. 1*a* and 1*b* the inventive regulating valve 1 for a door drive 2, and FIG. 2 the inventive door drive 2.

FIG. 1*a* shows the inventive regulating valve 1 for a door drive 2, wherein the regulating valve 1 has an axis of rotation 3, wherein the regulating valve 1 includes at least two ends 8, wherein the regulating valve 1 includes at least two sealing sections 12, wherein the regulating valve 1 includes a regulating section 4, wherein the regulating section 4 is disposed between the sealing sections 12.

Three respective radial thickenings 5 form both sealing sections 12. The radial thickenings 5 are spaced apart from each other along the axis of rotation 3. A radial tapering 6 forms the regulating section 4. The radial thickenings 5 are integrally formed with the regulating valve 1. The radial thickenings 5 extend rotation-symmetrically about the axis of rotation 3. The tapering 6 likewise extends rotation-symmetrically about the axis of rotation 3. In the direction of the axis of rotation 3, the tapering 6 has a symmetric cross-section.

Figure 1B:
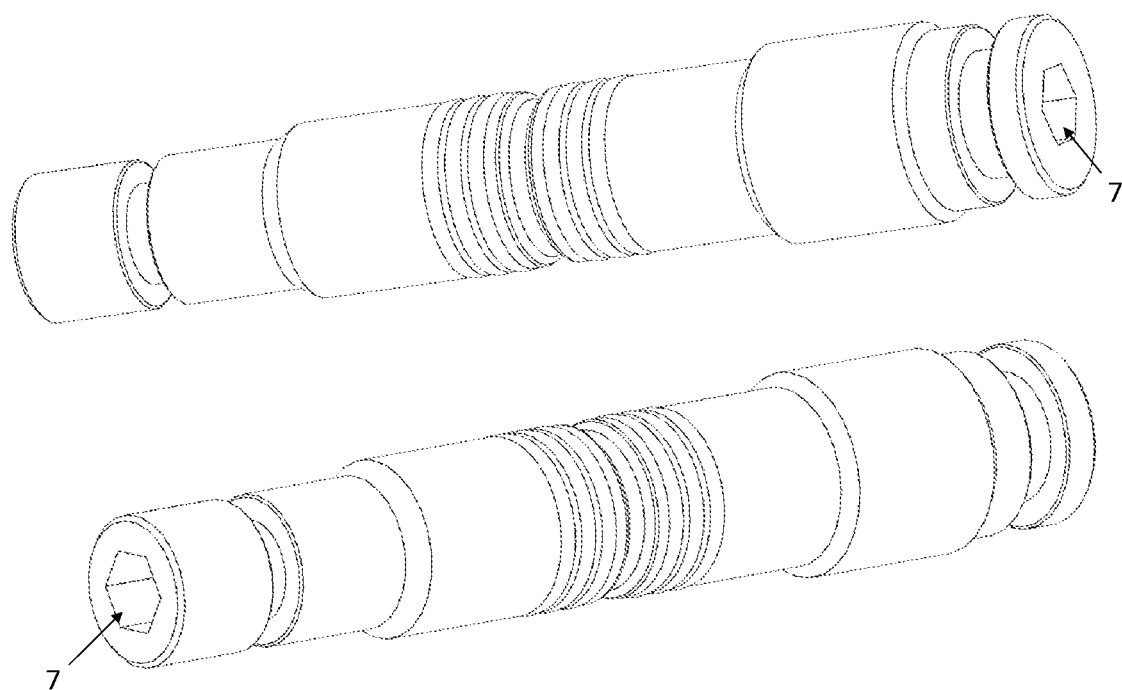

The regulating valve 1 has two engagements 7. The regulating valve 1 has two ends 8. One engagement 7 is disposed at each end 8. Thus, each end 8 has an engagement 7. In FIG. 1*b*, the regulating valve 1 of FIG. 1*a* is illustrated in a perspective view, so that the engagements 7 are better visible. Respectively one hexagon socket forms the engagements 7.

The regulating valve 1 includes a thread 9. The thread 9 is disposed at the right of the two ends 8 of the regulating valve 1. Thus, the right one of the two ends 8 includes both an engagement 7 and a thread 9. The thread 9 is formed coaxially to the axis of rotation 3.

The regulating valve 1 includes a guide section 10. The guide section 10 is disposed at the left one of the two ends 8. The guide section 10 has a smaller diameter than the right one of the two ends 8.

The regulating valve 1 includes two surrounding annular sealing grooves 11. The annular sealing grooves 11 serve for accommodating non-illustrated sealing rings. The annular sealing grooves 11 are disposed between one of the ends 8 and the nearest sealing section 12.

Figure 2:
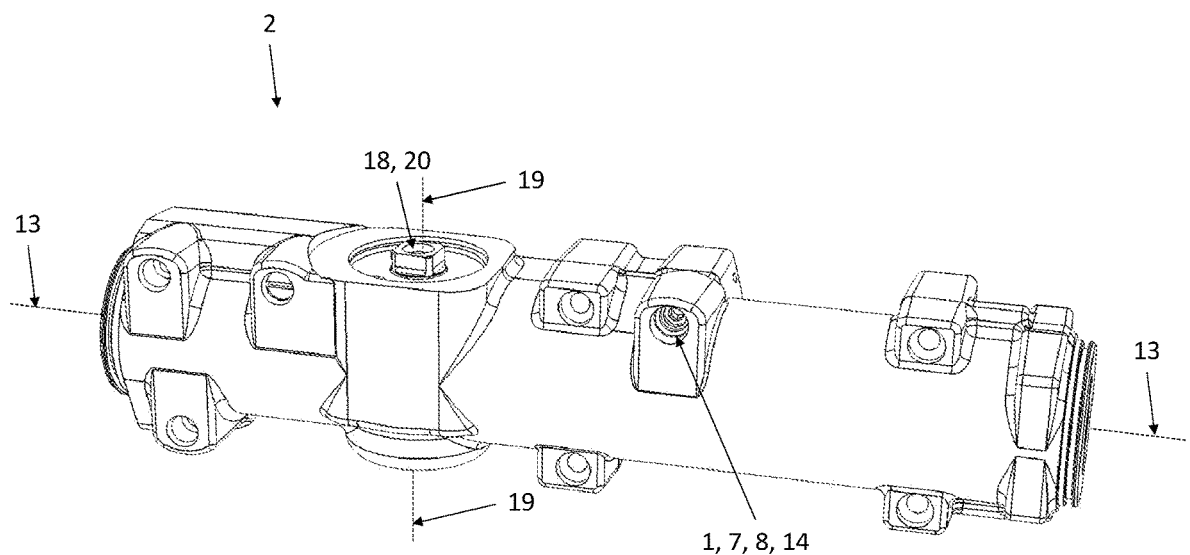

The thread 9 allows for screwing the regulating valve 1 into the regulating valve reception 14 of a door drive 2 (see FIG. 2). For this purpose, the regulating valve reception 14 has a receiving thread. The regulating valve 1 is rotatable about the axis of rotation 3 thereof via the engagement 7. When rotating the regulating valve 1 in the regulating valve reception 14, the regulating valve 1 is displaced along the axis of rotation 3 thereof. Hereby, the regulating valve 1 is also displaced in relation to hydraulic channels disposed in the door drive 1. Depending on the position of the regulating valve 1 in the door drive 2, hydraulic fluid can flow along the tapering 6 of the regulating valve 1 or is blocked.

FIG. 2 shows the inventive door drive 2. The door drive 2 includes a regulating valve reception 14. An inventive regulating valve 1 is disposed in the regulating valve reception 14. One end 8 of the regulating valve 1 is visible in FIG. 2. The end 8 of the regulating valve 1 includes an engagement 7. A hexagon socket forms the engagement 7.

The door drive 2 has a longitudinal axis 13. The door drive 2 includes an output shaft 18. The output shaft 18 is supported in the door drive 2. The output shaft 18 extends vertically to the longitudinal axis 13. The output shaft 18 is rotatable about an output axis 19. The output axis 19 extends vertically to the longitudinal axis 13. The output shaft 18 protrudes from the top side and from the bottom side of the door drive 1 from the door drive 1. At the two ends thereof, the output shaft 18 has a connection 20. In the Figure just the upper connection 20 is visible. The connections 20 serve for connecting a non-illustrated arm assembly. The regulating valve 1 is disposed vertically to the output axis 19.

The invention claimed is:

1. A regulating valve for a door drive, the regulating valve comprising: an axis of rotation, at least two ends, at least two sealing sections, wherein the regulating valve includes a regulating section, wherein the regulating section is disposed between the sealing sections, wherein the at least two sealing sections are each formed by at least one radial thickening, wherein at least one radial tapering of the regulating valve forms the regulating section disposed between the sealing sections, and the at least one radial tapering extends rotation-symmetrically about the axis of rotation, whereby the tapering has a symmetric cross-section.

2. The regulating valve for a door drive according to claim 1, wherein
the radial thickening or at least one of the radial thickenings is formed integrally with the regulating valve.

3. The regulating valve for a door drive according to claim 1, wherein
the regulating valve includes at least one engagement.

4. The regulating valve for a door drive according to claim 1, wherein
each end includes at least one engagement.

5. The regulating valve for a door drive according to claim 1, wherein
several radial thickenings form at least one of the sealing sections,
wherein the radial thickenings are spaced apart from each other along the axis of rotation.

6. The regulating valve for a door drive according to claim 1, wherein
the regulating valve is made from plastic material.

7. The regulating valve for a door drive according to claim 1, wherein
the regulating valve is an injection-moulded part.

* * * * *